3,614,858
APPARATUS FOR SEPARATING LIQUID FROM GAS
Eino Eemil Pohjolainen, Vuoksenniska, and Martti Aukusti Tolvanen, Paaskylahti, Finland, assignors to Enso-Gutzeit Osakeyhtio, Helsinki, Finland
Filed Apr. 15, 1969, Ser. No. 816,223
Claims priority, application Finland, Apr. 18, 1968, 1,080/68
Int. Cl. B01d 45/12
U.S. Cl. 55—269   8 Claims

ABSTRACT OF THE DISCLOSURE

This invention relates to an apparatus for separating liquid which might contain small particles of solid material from gas, the apparatus being mounted at the upper portion of a vertical heat exchanger and comprising a false bottom, at least one spiral wall and separate discharge connections for the separated liquid and for the purified gas. The mixture of gas and liquid in a quiet upwardly directed flow in a passage situated between a vertical spiral wall and the enveloping wal of the apparatus is converted into a spiral-formed horizontal flow, which is then throttled in a discharge opening formed between two spiral walls thus increasing the flow velocity to a value sufficient for centrifugal separation of the liquid from the gas. The free space between the spiral wall or walls is directly above the tube or lamella heat exchanger and is sufficiently large to permit tube or lamella replacement through said space.

BACKGROUND OF THE INVENTION

Field of the invention

This invention relates to an apparatus for separating liquid which might include particles of solid materials from gas. The apparatus is mounted in the upper portion of a substantially vertical tube or lamella heat exchanger and the apparatus is provided with a false bottom, at least one spiral plate, and separate discharge openings for the separated liquid, and for the pure gas. The apparatus is particularly adaptable in chemical wood pulp mill evaporating plants, where black liquor from pulp digestion is evaporated.

DESCRIPTION OF THE PRIOR ART

It is often necessary in industry to evaporate solutions containing organic and inorganic materials either in liquid, dissolved or solid form. It is usually very difficult to separate the evaporated vapour in a sufficiently pure state to avoid chemical losses. A further disadvantage is the fact that these substances, when entrained by the vapour, can cause difficulties in later stages of the process.

This problem presents itself as particularly difficult in chemical wood pulp mill evaporating plants, where black liquor from pulp digestion is evaporated. In addition to inorganic substances, this solution contains large quantities of organic substances of which particularly harmful are the surface tension reducing, foam forming substances such as fatty and resinous acids, dissolved in the cooking liquor and saponified. Evaporation of such solutions has always caused great difficulties, particularly as the vapour should be separated in as pure state as possible.

Many types of apparatuses for separating liquid substances from gas, are prior known, such as drop separators and foam distinguishers, but the results obtained have not been satisfactory. The prior known devices include common cyclones, and a mattress-like device consisting of spiral-formed steel wire, in a horizontal plane in the upper portion of the foam separator. It was hoped that the small liquid particles passing through the apparatus would be trapped in the spiral formed steel wires and that they thereupon would flow down as bigger drops. This drop separator proved, however, soon to be impracticable. Its pores blocked quickly and it had to be replaced frequently.

SUMMARY OF THE INVENTION

The object of this invention is to provide an apparatus for separating liquid which might contain particles of solid materials from gas, which is efficient and reliable in all operating conditions and which has the additional advantage of easy replaceability of the tubes or lamellae. The apparatus which comprises a false bottom, at least one spiral wall building a narrow spring to throttle the flow of the mixture of gas and liquid converted from a vertical flow into a horizontal flow, means to collect the separated liquid and to discharge it and a vertical space in the middle of the apparatus through which the tubes or lamellas of the heat exchanger can be replaced after removal of the false bottom and means for discharge of the separated gas.

BRIEF DESCRIPTION OF THE DRAWING

The invention is described in more detail in the following with reference to the accompanying drawings, in which.

DESCRIPTION OF THE PREFERRED EMBODIMENT

Figure 1:
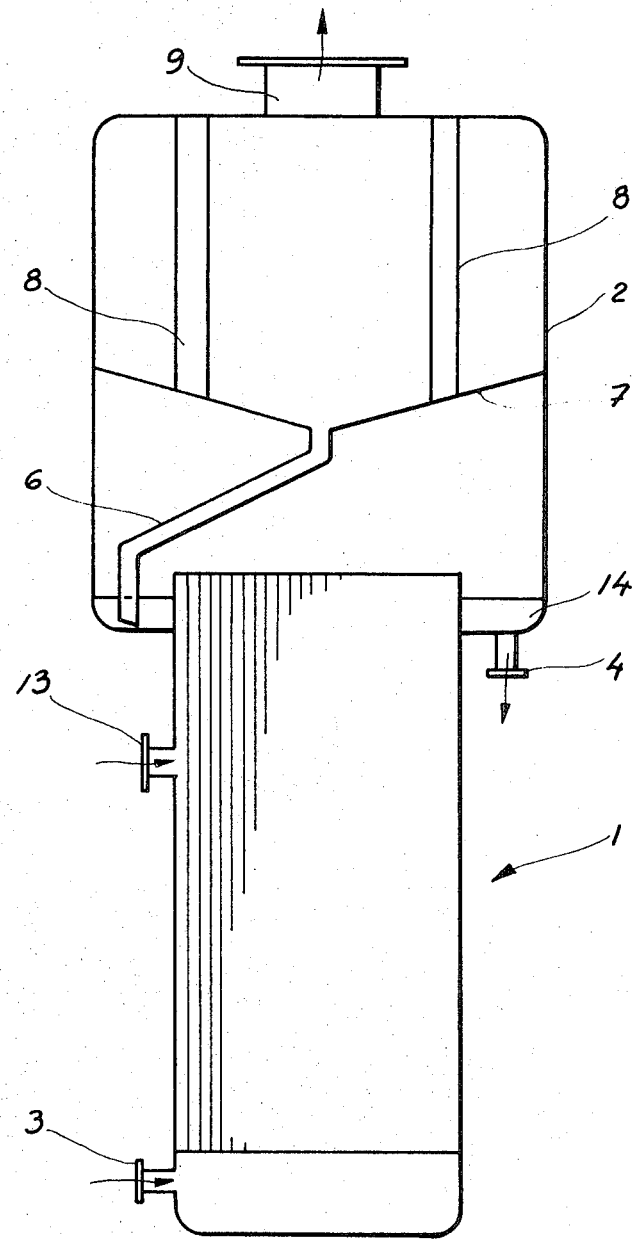
FIG. 1 shows a schematical sectional view of an embodiment of the invention, mounted in the upper portion of a vertical tube heat exchanger.

FIG. 1 shows an evaporating unit in its entirety, as having a vertical tube heat exchanger 1 which serves as the boiling section. In the upper portion there is provided the apparatus according to the inventon for separating liquor from gas such as vapour.

The liquid mixture to be evaporated is fed in the lower portion of the tube heat exchanger through an inlet connection 3. In the tube heat exchanger 1 the liquid mixture flows inside the tubes whereas steam is fed to the space outside the tubes through an inlet connection 13; the outlet connection is not shown. As heat is transferred from the steam through the tube walls to the liquid mixture to be evaporated, the latter starts to boil and erups from the upper ends of the tubes as a mixture of liquor and vapour. The main portion of the liquor is separated already at this stage and falls or flows to the separator bottom forming a pool 14. A considerable portion of the liquor is entrained by the vapour in the form of foam or droplets, to the upper portion of the apparatus, separated by a false bottom 7 from the lower portion. According to the invention one or more, in this case two, vertical spiral walls 8 are mounted on the false bottom so as to co-operate with the cylindrical wall 2 of the apparatus to form two passages 15 through which the liquor-vapour mixture is caused to flow.

The pure vapour is discharged through the discharge opening 9 situated at the top of the apparatus, and the separated liquor is passed through the apex of the downward directed cone formed by the false bottom 7, through a tube 6 to the pool 14 at the bottom of the apparatus, preferably through a liquid seal. The separated liquid is discharged through a discharge opening 4.

Figure 2:
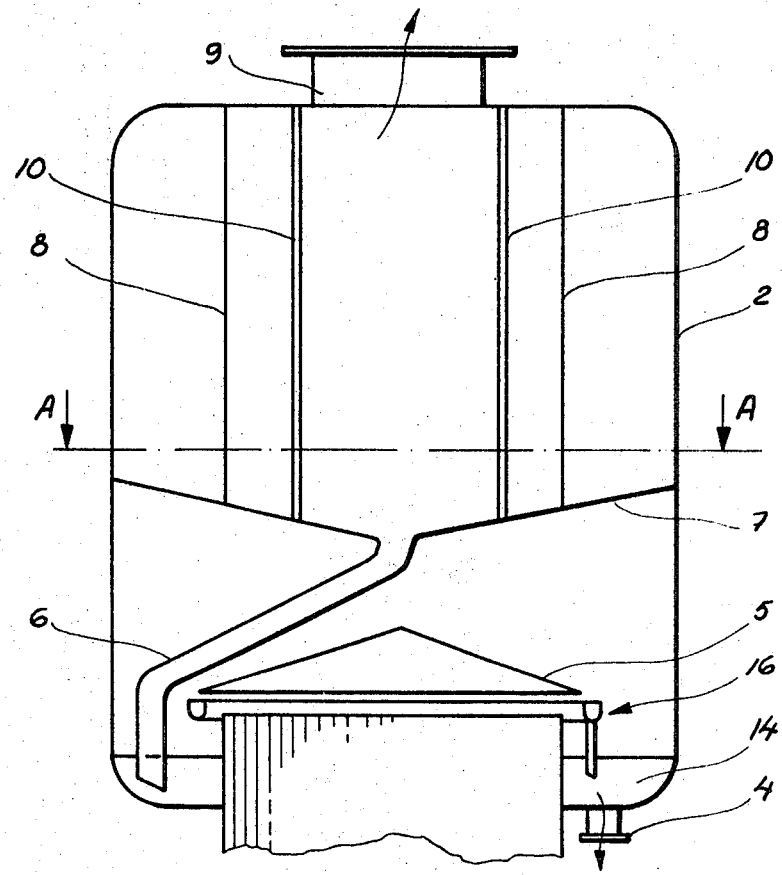
FIG. 2 shows an alternative embodiment.
Figure 3:
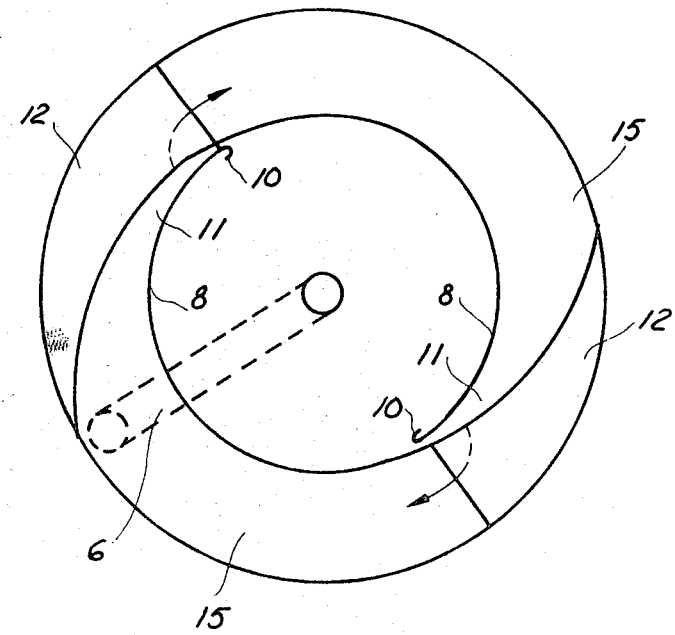
FIG. 3 shows a section along the line A—A in FIG. 2.

FIGS. 2 and 3 illustrate a preferred embodiment of the apparatus according to the invention. According to this embodiment there is provided a splash plate 5 in the form of an upward pointing cone, situated above the tube heat exchanger, and extending with its peripheral edge a little over the tube plate. Liquor droplets attached to the upper and lower surface of the plate flow along the inclined surface to the periphery where they fall through a trough 16 provided adjacent and under the peripheral edge. The trough 16 prevents the droplets from being re-entrained by the vapour flow. As best shown in FIG. 2 the liquor collected in the trough 16 is passed to the pool 14 at the bottom of the separator, through a pipe provided in the lower portion of the trough, separately from the gas flow. The pipe terminates preferably in a liquid seal.

A portion of the liquor is, however, entrained by the vapour to the upper or the aftertreatment portion of the apparatus.

As shown in FIG. 3, the liquor-vapour mixture is introduced in the aftertreatment chamber through openings 12 provided diametrally at the periphery of the false bottom 7. The number of the openings is in this case two, since the number of the spiral walls 8 also is two. In the passage 15 between the spiral walls 8 and the outer wall 2, the relatively quiet flow of the liquor-vapour mixture is forced into a horizontal flow of spiral form. During this slow flow, comprising about one half of a revolution, the more weighty liquid drops fall or flow to the bottom of the passage 15, i.e. to the false bottom 7, and flow further along the cone shaped false bottom and through the discharge pipe 6.

At the terminating end of the passage 15 the liquor-vapour flow is throttled between both spiral walls so as to multiply the flow velocity, preferably to a value between 3 to 10 times the original, comprising from 16 to 60 metres per second in the discharge opening.

The throttling wof the spiral formed flow and the reduction of its curvature radius have the effect that the heavier particles such as liquor droplets are pressed against the spiral walls flowing along the same in the form of a liquor film, simultaneously falling through gravity to the false bottom 7. A considerable portion of the liquor would, however, not have time to fall to the false bottom 7 before it would be re-entrained by the liquor-vapour flow emerging from the other discharge passage 11, if there would not be provided an inwardly directed trough 10 in the back edge of the spiral wall 8. The lighter vapour is discharged in a pure state through a discharge opening 9.

The height of the discharge opening 11 is preferably at least four times greater than its width, and its width cam, if so desired, be adjusted from the outside by means of special control elements.

According to the invention the space in the middle of the aftertreatment chamber is directly above the tube heat exchanger 1, and the cross section of this space is equal or greater than the cross section of the tube heat exchanger. This arrangement provides the additional advantage that the tubes of the tube heat exchanger can easily be replaced, in which case the optional splash plate 5 and the upper and lower portions defining the space in the middle of the aftertreatment chamber, are removable, so that the tubes of the tube heat exchanger can be lifted out directly through the space between the spiral walls 8, and replaced, without the necessity of removing the entire apparatus. The space under the tube heat exchanger is seldom sufficiently large to permit tube replacement that way.

Particularly when evaporating black liquor, the useful life of heat exchanger tubes is relatively short, about 2 to 3 months, wherefore it is obviously important to be able to replace them easily and quickly.

In the apparatus according to the invention the separation of liquor and the possible solid particles in it is very efficient by virtue of the trough 10 formed in the back edge of the spiral wall and directed inward. The liquor flowing in the space in the middle of the aftertreatment chamber and on the side of the spiral walls 8, impinges against the trough 10 which prevents the liquor from being re-entrained by the liquor-vapour mixture emerging from the discharge opening 11.

The trough 10 is formed simply by bending backward the back edge of the spiral wall 8, or alternatively it can consist of a longitudinally split pipe-half attached to the back edge of the spiral wall.

The operation of the apparatus can be made more effective in a simple manner by making the back edge of the spiral wall inclined i.e. by making the upper edge of the spiral wall shorter than its lower edge, thus causing the liquor to impinge against the trough at a predetermined angle, so that a portion of its kinetic energy is converted to a downwardly directed motion component. Thus the retention time of the liquor in the trough of the spiral wall can be appreciably reduced, thus reducing the risk that liquor would flow over the trough 10 provided at the back edge of the spiral wall. Even increasing the feed becomes possible.

We claim:

1. Apparatus for separating liquid from gas, comprising a vertical tubular heat exchanger including a plurality of tubes; a cylindrical casing mounted on top of the heat exchanger communicating with the tubes; a false bottom partition within the casing separating the space within the casing into an upper portion and a lower portion including an opening adjacent the casing side wall; two generally vertically oriented spaced opposed spiral walls inside the upper portion and attached to the false bottom partition and to the side and upper wall of the casing, the spiral walls, the casing upper walls and the false bottom partition forming an inwardly tapering passage communicating at one end with said partition opening and having a discharge opening at the other end for throttling of flow of liquid and gas and multiplying the velocity of flow to at least three times an initial flow velocity to produce a flow velocity of at least 15 meters/second, said discharge opening having a height which is at least four times its width in order to separate out liquid from the flow on a surface of the spiral wall facing the space in the upper portion bounded by the spiral wall; means connected to the false bottom partition for discharging separated liquid and conveying the liquid out of the path of flow from the tubes; and means connected to the casing centrally of said upper portion for discharging purified gas.

2. Apparatus according to claim 1, wherein the false bottom partition is in the form of a downwardly pointing cone having a discharge pipe for the liquid provided at its apex and in that the pipe terminates in a liquid seal.

3. Apparatus according to claim 1, wherein the passages are also provided with a false bottom partition.

4. Apparatus according to claim 1, wherein openings are provided in the false bottom partition peripherally between the spiral wall and the side wall of the casing, one opening for each spiral wall.

5. Apparatus according to claim 1, wherein a back edge of the spiral wall forming one side of the discharge opening is provided with a trough directed toward the inside of the apparatus, for preventing separated liquid flowing along the spiral wall from being re-entrained in the gas flow.

6. Apparatus according to claim 5, characterized in that the trough is formed from the back edge of the spiral wall.

7. Apparatus according to claim 5, characterized in that the trough consists of longitudinally split pipe-half attached to the back edge of the spiral wall.

8. Apparatus according to claim 5, wherein the back edge of the spiral wall is inclined so that an upper edge of the spiral wall is shorter than a lower edge of the spiral wall.

(References on following page)

References Cited

UNITED STATES PATENTS

| | | | |
|---|---|---|---|
| 522,416 | 7/1894 | Iles | 55—659 |
| 551,161 | 12/1895 | Galennie | 159—31 |
| 1,784,627 | 12/1930 | Hamill | 55—655 |
| 1,917,606 | 7/1933 | Sillers | 55—204 |
| 1,950,020 | 3/1934 | Bleibtreu et al. | 55—455 |
| 1,182,220 | 5/1916 | Seeger | 159—31 |
| 1,591,147 | 6/1926 | Wales | 55—455 |

FOREIGN PATENTS

| | | |
|---|---|---|
| 16,269 | 1905 | Great Britain. |
| 473,358 | 1937 | Great Britain. |
| 522,114 | 6/1940 | Great Britain. |

FRANK W. LUTTER, Primary Examiner

B. D. WOZICK, Assistant Examiner

U.S. Cl. X.R.

55—453, 455, 462, 466; 122—34; 159—31